US007633075B2

(12) United States Patent
Ono et al.

(10) Patent No.: US 7,633,075 B2
(45) Date of Patent: Dec. 15, 2009

(54) THROUGH HOLE FORMATION STATE DETECTING DEVICE AND ELECTRONIC TIMEPIECE USING THE DETECTING DEVICE

(75) Inventors: Haruo Ono, Akishima (JP); Hiroyuki Chubachi, Kiyose (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 12/236,601

(22) Filed: Sep. 24, 2008

(65) Prior Publication Data

US 2009/0084936 A1 Apr. 2, 2009

(30) Foreign Application Priority Data

Sep. 28, 2007 (JP) ............................ 2007-255357

(51) Int. Cl.
*G01N 21/86* (2006.01)

(52) U.S. Cl. .................................... 250/559.3; 250/548

(58) Field of Classification Search ............. 250/559.3, 250/548, 221, 231.15, 236; 356/614, 615; 368/8-11, 31-35
See application file for complete search history.

(56) References Cited

U.S. PATENT DOCUMENTS 6,310,687 B1 * 10/2001 Stumbo et al. .............. 356/317

FOREIGN PATENT DOCUMENTS

| | | |
|---|---|---|
| JP | 5-199178 A | 8/1993 |
| JP | 2000-162336 A | 6/2000 |
| JP | 2002-42262 A | 2/2002 |
| JP | 2007-40863 A | 2/2007 |

* cited by examiner

*Primary Examiner*—Que T Le
(74) *Attorney, Agent, or Firm*—Frishauf, Holtz, Goodman & Chick, P.C.

(57) ABSTRACT

When a light emission element emits no light, a detected signal from a photodetection element is captured as an intensity of external light. Then, a threshold value is offset by the intensity of the external light. The offset threshold is then compared to a detected signal from the photodetection element when the light emission element emits light, thereby determining the presence of a through hole between the light emission element and the photodetection element through which hole light passes without being influenced by external light.

8 Claims, 16 Drawing Sheets

6° STEP (1): WHEN N=0

(2): WHEN IT SHOULD BE DETERMINED THAT NO THROUGH HOLE IS FORMED (3): WHEN IT SHOULD BE DETERMINED THAT A MAXIMUM THROUGH HOLE IS FORMED (1): WHEN N=3
(2): WHEN IT SHOULD BE DETERMINED THAT NO THROUGH HOLE IS FORMED
(3): WHEN IT SHOULD BE DETERMINED THAT A MAXIMUM THROUGH HOLE IS FORMED

THROUGH HOLE FORMATION STATE DETECTING DEVICE AND ELECTRONIC TIMEPIECE USING THE DETECTING DEVICE

CROSS-REFERENCE TO RELATED APPLICATIONS

This application is based upon and claims the benefit of priority from the prior Japanese Patent Application No. 2007-255357, filed Sep. 28, 2007, the entire contents of which are incorporated herein by reference.

BACKGROUND OF THE INVENTION

1. Field of the Invention

The present invention relates to a through hole formation state detecting device which determines an aligning state of apertures each provided in a respective one of a plurality of moving members, thereby determining whether a though hole is formed through which light can pass. The present invention also relates to an electronic timepiece which detects an aligning state of apertures each provided in a respective one of a plurality of gears or wheels which drive hands of an analog display, thereby detecting the position of the hands.

2. Description of the Related Art

Analog display timepieces are known which receive a standard time and frequency signal to automatically set a time to time codes of the frequency signal. Other electronic timepieces are also known in which an operation button is operated to electrically drive and rotate the hands, thereby setting various functions, for example, including setting an alarm time. Such functions are achieved by rotating the hands after the controller recognizes the position of the hands.

When electronic timepieces having an analog display are put in a strong magnetic field or shocked greatly, the hands can become offset from their positions which the controller has recognized. Unless the hands are set to their positions which the controller has recognized, the time indicated by the hands is left offset from a correct time. In order to avoid such undesirable situation, recent electronic timepieces have an internal hand position detector which confirms at predetermined intervals of time whether the hands are offset from the correct time. Some electronic timepieces have been developed which have the function of automatically correcting the hand positions when detecting the hand offsets.

A hand position detecting mechanism is known, which includes a photo-interrupter which detects alignment of a plurality of apertures each provided in a respective one of gears moving along with the corresponding hands, for example, as disclosed in Japanese Published Unexamined Patent Application 2000-162336.

Further, prior art techniques related to the present invention are, for example as follows. Japanese Published Unexamined Patent Application 2007-40863 discloses a wristwatch which includes a photosensor of a photo-interrupter which detects the position of a hand, provided on the side of a dial where external light is difficult to enter the photosensor and a light emitting element provided on the side of a back plate of the timepiece in order to prevent wrong detection due to the external light entering the photosensor. Japanese Published Unexamined Patent Application 2002-42262 discloses a technique for negating testing of a fire alarm, which detects a fire with a photosensor and reports it, when strong external light enters the fire alarm during the testing. Japanese Published Unexamined Patent Application Hei 05-199178 discloses a remote controller which includes a photodetection unit which senses external light with two sensors, and which weights the signals differently from the two sensors to reduce the influence of external light, thereby receiving a remote control signal.

In the device disclosed in the Application 2007-40863, when external light enters the photodetection element of the photo-interrupter, the device may wrongly detect an aligning state of the apertures in the gears.

Generally, external light often enters the timepiece through a hand aperture provided at the center of the dial. When the dial is formed of a liquid crystal panel or a solar panel as the timepieces become multifunctional, the dimensional accuracy of the hand aperture in the dial is somewhat deteriorated, thereby somewhat increasing an amount of external light entering the timepiece.

Since light is randomly reflected within the timepiece by various parts included in the timepiece, it is difficult to prevent external light which has entered the timepiece from entering the photodetection element even when the arrangement of the photointerrupter is changed.

Further, in the photo-interrupter, it is usually determined that there is a through aperture in moving members between the light emission element and the light detection element when the light detection element receives light having a strength more than a predetermined threshold from the light emission element through the through apertures in the moving members. If a circuit configuration is used which determines the presence of a through aperture using a digital control circuit such as, for example, a microcomputer, it usually performs AD conversion on received light of the photo-interrupter, and compares a resulting value with a threshold, thereby determining whether there is a through hole formed. Especially, if the threshold is settable as a variable digital value, usually, the light received by the photodetection element is subjected to AD conversion, and then captured.

When a general successive comparison type AD converter is used, the AD conversion requires a time of a plurality of clocks depending on the resolution of AD converter. Thus, if it is required to try to find the presence of a through hole successively many times, it would take much time until the through hole is found. Such problem becomes remarkable when the hands are rotated at high speeds to locate a predetermined arrangement of the gears in the hand position correcting process, for example, for an analog display timepiece.

The light emission element is required to continue to emit light in the AD conversion. Thus, when the time required for the AD conversion increases, the emission time of the light emission element and its consumption power would increase. Such problem becomes remarkable, for example, when a wristwatch which is driven by a battery employs a method of determining whether a through hole is formed, by performing the AD conversion many times.

The problem of a deterioration in the detection accuracy of the through hole due to external light, and the problem of consumption of the time and power required for determination of the through aperture to be made many times in the AD conversion of the received light occur not only to the analog display timepieces but also to various other devices in which the photo-interrupter detects a hole formed based on aligning apertures in the moving members.

SUMMARY OF THE INVENTION

It is therefore an object of the present invention to provide a through hole formation state determining device capable of determining the presence of a through hole in the moving members correctly without being influenced by external light.

In order to achieve the above object, one aspect of the present invention provides a through hole formation state determining device comprising a light emission element which emits light when electrically driven, at least one moving member with an aperture through which light can pass, and a photodetection element which detects light from the light emission element, thereby outputting a detected signal indicative of the intensity of the detected light, the light emission element and the photodetection element being disposed at such positions that when the aperture in the at least one moving member aligns with a predetermined position, light from the light emission element passing through the aligning aperture to the photodetection element, the through aperture determining device comprising: external light intensity setting means for capturing a detected signal from the photodetection element when the light emission element is in a non-emission state and for setting the measurement of the detected signal as the intensity of the external light; and determining means for capturing a detected signal from the photodetection element when the light emission element is in a light emission state after the intensity of the external light is set by the external light intensity setting means, for offsetting a threshold to be compared with the detected signal by the intensity of the external light, for comparing the offset threshold with the value of the detected signal, and for determining in accordance with a result of the comparison whether the aperture in the at least one moving member is at the predetermined position.

According to the one aspect of the present invention, a detected signal from the photodetection element is captured when the light emission element is in the non-emission state and the measurement of the detected signal is set as an intensity of the external light. Then, the light emission element is then caused to emit light and a detected light signal from the photodetection element is captured. A threshold is then offset by the intensity of the external light. A resulting threshold is then compared with the last-mentioned captured detected signal and it is determined in accordance with a result of the comparison position whether the aperture in the at least moving member is at the predetermined position. Thus, the detection of a hole based on the aperture in the at least one moving member is performed with a high accuracy without being influenced by the external light.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE PREFERRED EMBODIMENTS

First Embodiment

Figure 1:
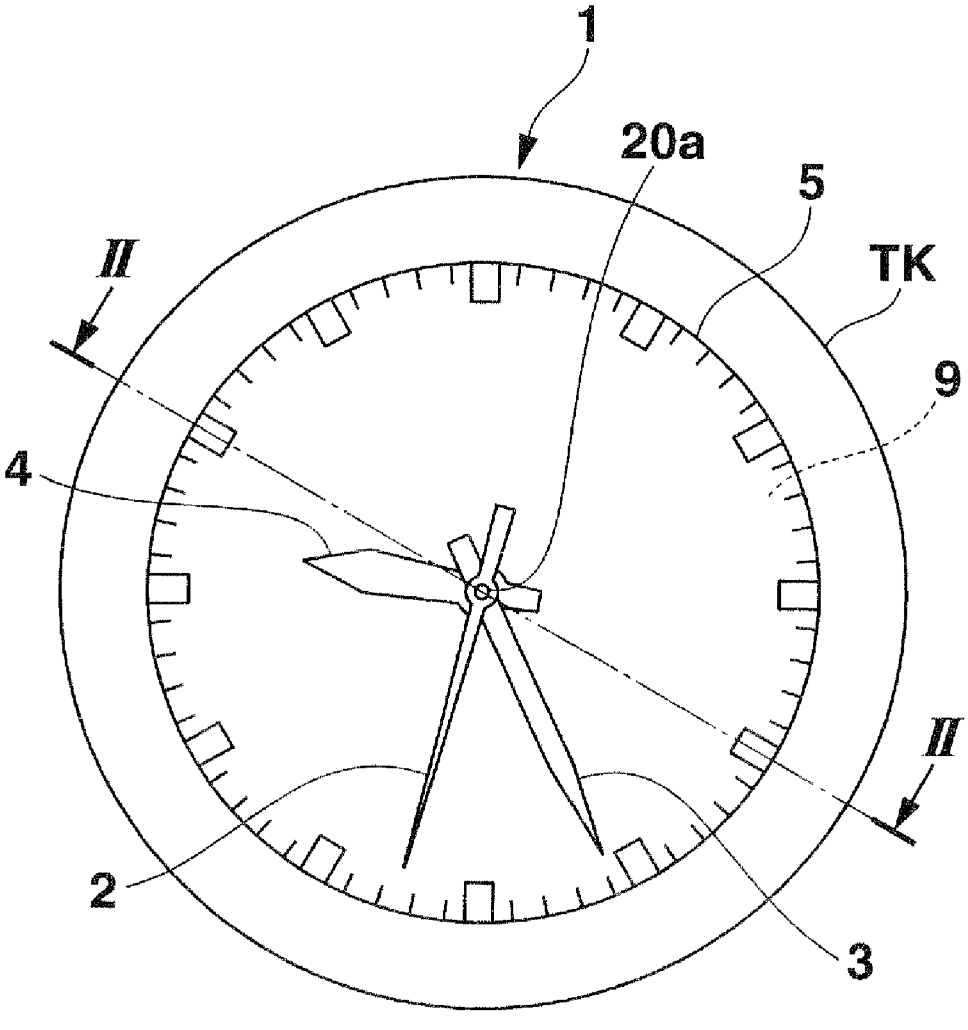
FIG. 1 is a front view of a timepiece module as one embodiment of the present invention.
Figure 2:
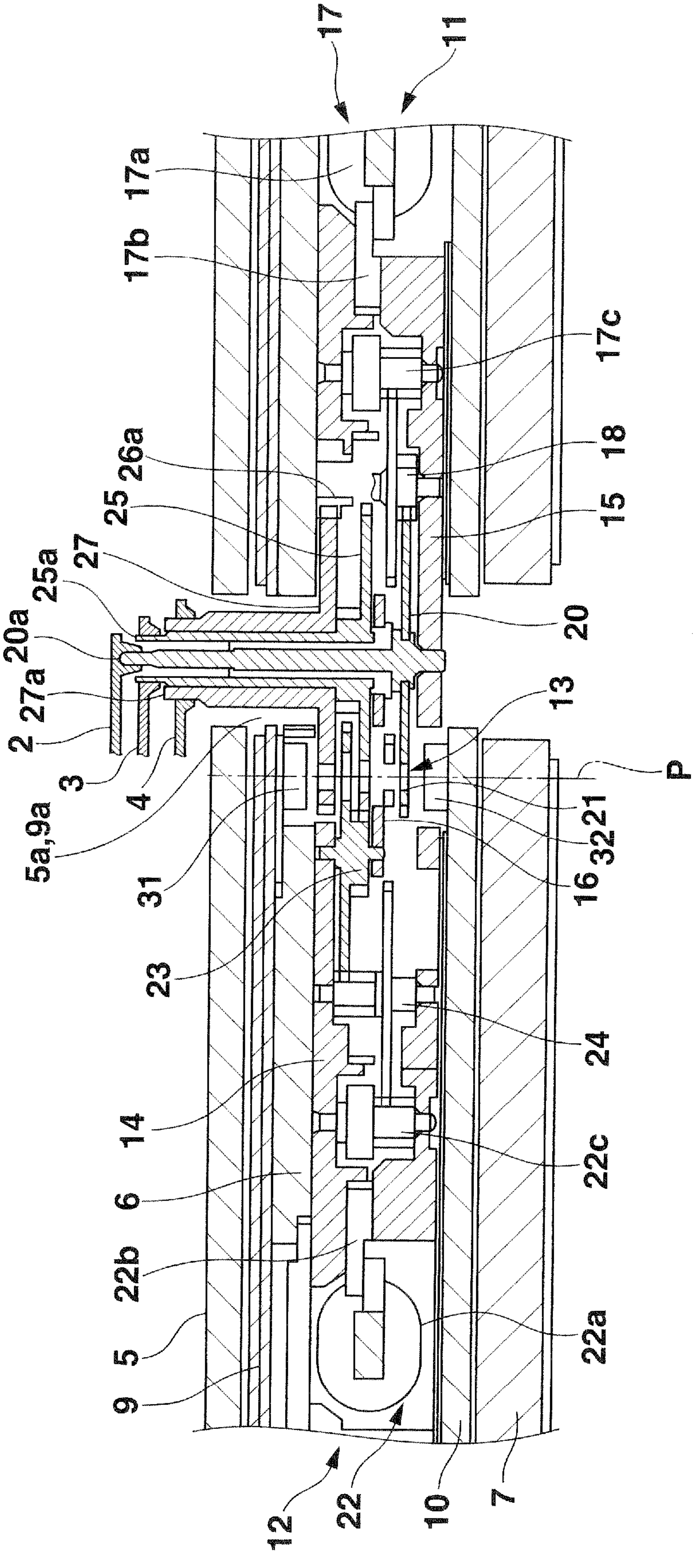
FIG. 2 is a cross-sectional view taken along a line II-II of the timepiece module in FIG. 1.
Figure 3:
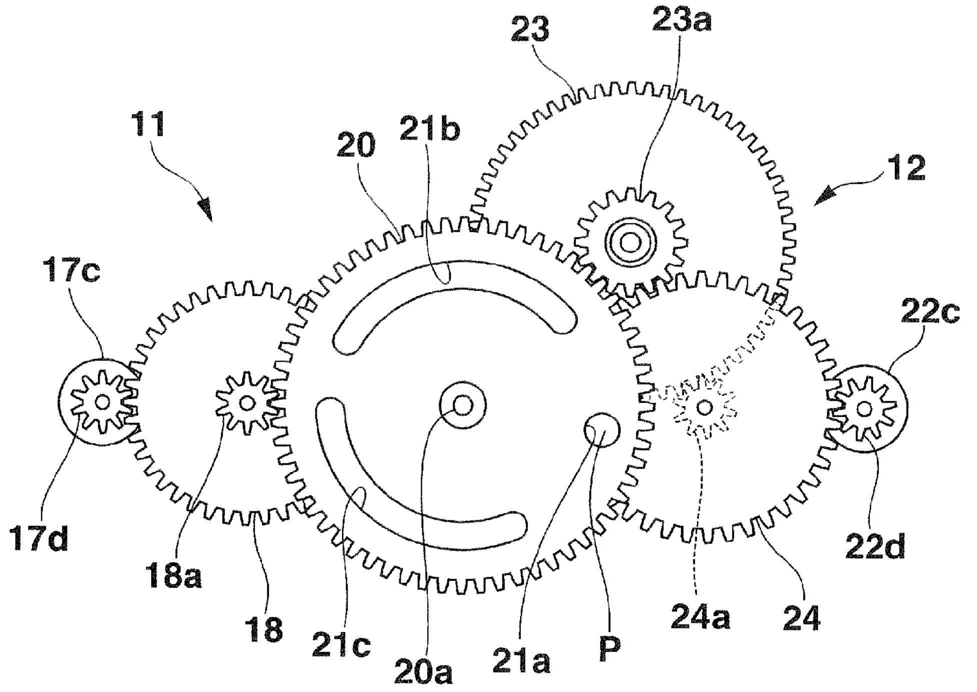
FIG. 3 is a back view of a gear mechanism which rotates the hands as viewed from its back side.

FIG. 1 is a front view of a timepiece module as one embodiment of the present invention. FIG. 2 is a cross-sectional view taken along a line II-II in FIG. 1. FIG. 3 is a back view of a gear mechanism which drives hands of the timepiece, as viewed from its back side.

The timepiece module 1 comprises a body of an electronic analog wristwatch which rotates hands, for example, under electronic control. A dial 5 and a solar panel 9 are provided under a glass on the side of the front of the timepiece module 1. The front side of the internal mechanism of the timepiece module is covered with the dial 5 and the solar panel 9 and the other side of the internal mechanism with a body frame TK so as to be shielded from light. A seconds hand 2, a center hand 3 and an hour hand 4 are attached to tops of shafts 20*a*, 25*a* and 27*a* which extend from the internal mechanism to the front side of the timepiece through apertures 5*a* and 9*a* provided at the center of the dial plate 5 and the solar panel 9, respectively. When the seconds, center and hour hands 2, 3 and 4 are driven above the dial 5, a time is displayed.

As shown in FIG. 2, the shafts 27*a* and 25*a* to which the hour and center hands 4 and 3 are respectively secured are hollow. The center hand shaft 25*a* extends through the hollow hour hand shaft 27*a* and the seconds hand shaft 20*a* extends through the hollow center hand shaft 25*a* such that these shafts 20*a*, 25*a* and 27*a* are rotated around the same axis.

The seconds, center and hour shafts 20*a*, 25*a* and 27*a* are secured to the respective rotational centers of the seconds, center and hour wheels 20, 25 and 27 disposed on the back side of the dial 5. These wheels 20, 25 and 27 are arranged to rotate around the same rotational axis. In FIG. 3, the center wheel 25 and the hour wheel 27 are disposed so as to be at the same position as the seconds wheel 20.

As shown in FIG. 3, the driving system for the timepiece module 1 includes a first driving system 11 which drives the seconds wheel 2, and a second driving system 12 which drives the hour and center hands 4 and 3 in conjunctive relationship. The first and second driving systems 11 and 12 are driven independently. The first driving system 11 includes a first stepping motor 17, a fifth wheel 18, and the seconds wheel 20 such that rotation of a rotor 17*c* of a first stepping motor 17 is transmitted sequentially to a rotor pinion 17*d*, the fifth wheel 18, a fifth wheel pinion 18*a* and the seconds wheel 20, thereby rotating the seconds wheel 20 and its hand 2.

The second driving system 12 comprises a second stepping motor 22, an intermediate wheel 23, a third wheel 24, the center wheel 25, a minute wheel (not shown) and the hour wheel 27. Rotation of a rotor 22*c* of the second stepping motor 22 is transmitted to a rotor pinion 22*d*, the third wheel 24, a third wheel pinion 24*a*, the intermediate wheel 23, an intermediate wheel pinion 23*a* and the center wheel 25. Further, rotation of a center wheel pinion 25*b* is transmitted through the minute wheel, its pinion 26*a* (see FIG. 2), and the hour wheel 27 such that the center wheel 25 and its hand 3, and the hour wheel 27 and its hand 4 are rotated in conjunctive relationship.

In FIG. 2, a reference numeral 6 denotes an upper housing, 7 a lower housing, 10 a circuit board, 14-16 plates which retain the respective shafts of the gears, 17*a* a coil block of the first stepping motor 17, 17*b* a stator of the first stepping motor 17, 22*a* a coil block of the second stepping motor 22, and 22*b* a stator of the second stepping motor 22.

The internal mechanism of the timepiece module 1 comprises a detection unit 13 which detects an aligning state of apertures provided in the gears (or hour wheel 27, center wheel 25, seconds wheel 20 and intermediate wheel 23). The detection unit 13 comprises a light emission element 31 which emits light due to electric driving, and a photodetection element 32 which receives light from the light emission element 31 and then outputs a corresponding detected signal. The light emission element 31 comprises, for example, a light emitting diode and the photodetection element 32 comprises, for example, a phototransistor although their details will be described later. In this embodiment, the light emission element 31 and the photodetection element 32 are provided on the sides of the dial 5 and the back cover, respectively, with the gears disposed in between. When the apertures in the gears align at a detection position P, light emitted by the light emission element 31 is received and detected by the photodetection element 32 through the aligned apertures. Unless the apertures in the gears align at the detection position P, the majority of the light emitted by the light emission element 31 is shielded by the bodies of the gears and only a small part of the light reaches and is detected by the photodetection element 32.

Figure 4:
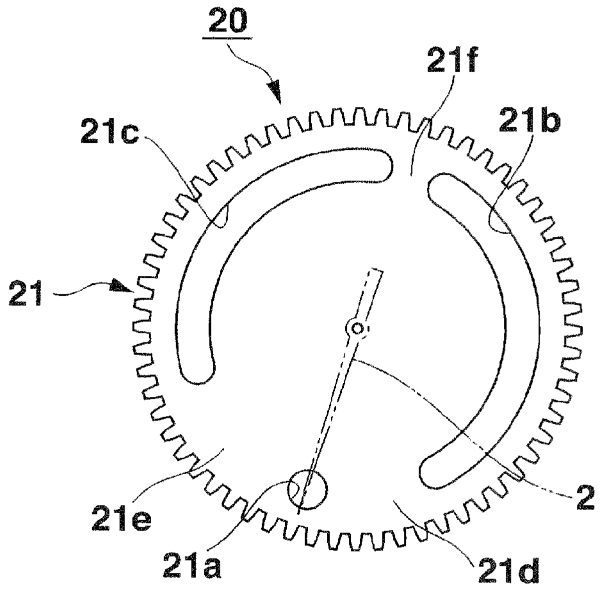
FIG. 4 is a front view of a seconds wheel with apertures.
Figure 5:
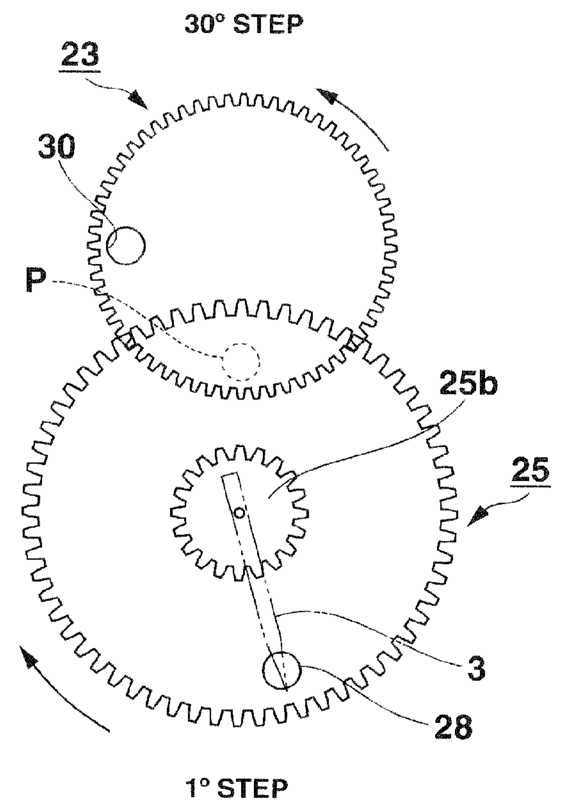
FIG. 5 is a front view of a combination of a center and a third wheels each with an aperture.
Figure 6:
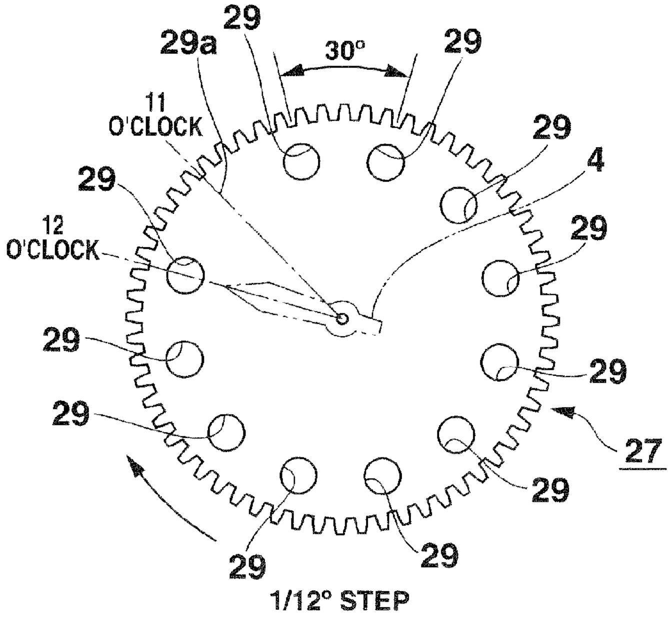
FIG. 6 is a front view of an hour wheel with apertures.

FIGS. 4-6 are front views of the seconds, center, intermediate and hour wheels 20, 25, 23 and 27 each with one or more apertures.

As shown in FIG. 4, the seconds wheel 20 has a circular aperture 21*a* provided at a position where the aperture aligns with the seconds hand 2, and two arcuate apertures 21*b* and 21*c* provided along the circumference of the same circle as the circular aperture 21*a*. A first light blocking area 21*d* is formed between the circular aperture 21 and the arcuate aperture 21*b*. A second light blocking area 21*e* is formed between the circular aperture 21*a* and the arcuate aperture 21*c*. The light blocking areas 21*d* and 21*e* are different in length. A third light blocking area 21*f* between the arcuate apertures 21*b* and 21*c* is located at a position 180 degrees spaced from the center of the circular aperture 21*a*.

As shown in FIG. 5, the center wheel 25 has a circular aperture 28 therein at a position where the aperture 28 can align with the center hand 3. The circular aperture 28 is on the circumference of the same circle as the circular aperture 21*a* in the seconds wheel 20. The intermediate wheel 23 has a circular aperture 30 provided at a position therein where the aperture 30 can align with the aperture 28 in the center wheel 25.

As shown in FIG. 6, the hour wheel 27 has 11 circular apertures 29 provided at angular intervals of 30 degrees with a particular one of the apertures 29 aligning with the hour hand 4. The hour wheel 27 has no aperture at a 11 o'clock position therein and includes a fourth light blocking area 29*a* there. The circular apertures 29 are provided on the circumference of the same circle as the apertures 21*a* and 28 in the seconds and center wheels 20 and 25.

The apertures 28 and 30 in the center and intermediate wheels 25 and 23 and a relevant one of the apertures 29 in the hour wheel 27 align at the detection position P at a respective one of 11 successive o'clock particular minutes, for example, including 0 o'clock 50 minutes, 1 o'clock 50 minutes, 2 o'clock 50 minutes, . . . , and 10 o'clock 50 minutes. At 11 o'clock 50 minutes, the fourth light blocking area 29*a* of the hour wheel 27 comes to and covers the detection position P, thereby forming no through hole. In a state where the arcuate apertures 21*b* and 21*c* in the seconds wheel 20 also are at the detection position P, the center and hour hands 3 and 4 are rotated for 12 hours and their numbers of rotations are counted while the aligning state of the apertures is detected by the detection unit 13. Each time these wheels are rotated for one hour, alignment of the apertures 28, 29 and 30 and hence the position of the center hand 3 are detected. In this case, due to the presence of the light blocking area 29*a*, alignment of the apertures 28, 29 and 30 is not detected for one hour, thereby allowing the position of the hour hand 4 to be detected.

Assume that the seconds hand 2 is rotated for 60 seconds and its number of rotations is counted in a state where the apertures 28-30 have aligned with the detection position P, while the detection unit 13 is determining the aligning state of the apertures. In this case, a pattern is obtained indicating arrangement of the circular aperture 21*a*, first light blocking area 21*d*, arcuate aperture 21*b*, its third light blocking area 21*f*, arcuate aperture 21*c* and second light blocking area 21*c* in the seconds wheel 20, thereby allowing the position of the seconds hand 2 to be detected.

Figure 7:
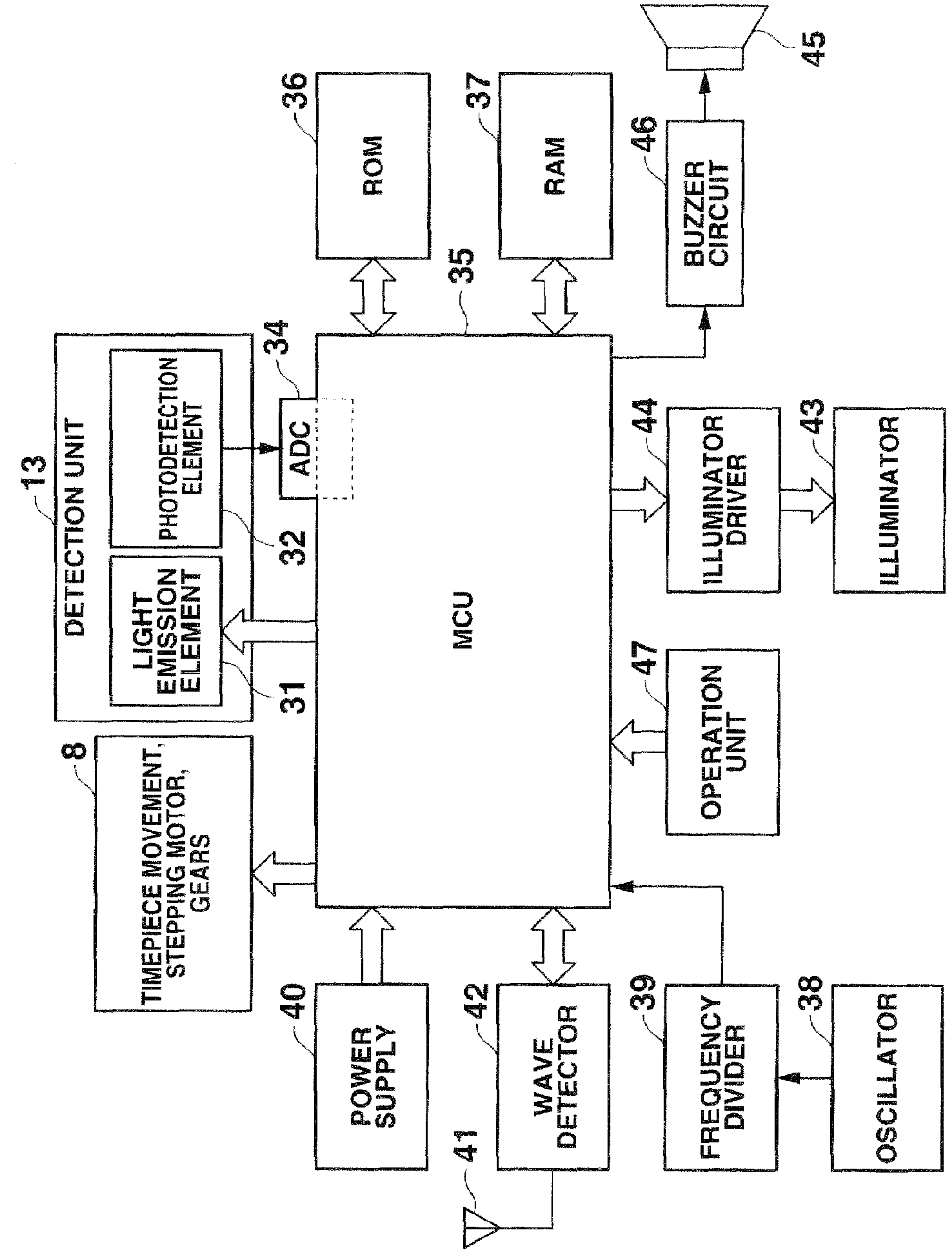
FIG. 7 is a block diagram of a circuit configuration of the timepiece module.

Referring to FIG. 7, there is shown a block diagram of the timepiece module 1. The timepiece module comprises a timepiece movement 8 which in turn comprises the first and second stepping motors 17 and 22 to drive the hands 2-4 of the timepiece, the detection unit 13 which detects the aligning state of the apertures in the gears (seconds, center, intermediate and hour wheels 20, 25, 23 and 27), an AD converter 34 which digitizes a detected signal from the photodetection element 32 of the detection unit 13, a microcomputer 35 which comprises a CPU (Central Processing Unit) to control the whole device, a ROM (Read Only Memory) which has stored a control program and control data, a RAM (Random Access Memory) 37 which provides a working memory space for the CPU, an oscillator 38 and a frequency divider 39 which create a clock for counting time, a power supply 40 which produces power for various components of the device from a battery and supplies it to the respective elements, an antenna 41 and a radio wave detector 42 which receive and capture a standard time and frequency signal which includes time codes, an illuminator 43 and an illuminator driver 44 which illuminate a timepiece display, a speaker 45 and a buzzer circuit 46 which provide an alarm output, and an operation unit 47 which includes a plurality of operation buttons.

The microcomputer 35 comprises a time counter that counts a date and time. The time counter counts up clocks from the frequency divider 39, thereby recording a current date and time. When the wave detector 42 receives the standard time and frequency signal, the CPU sets the time counter to a value represented by the time codes of the signal such that the internal time is synchronized with the current time. The microcomputer 35 comprises hand position counters each of which counts positions of a respective one of the seconds, center and hour hands 2, 3 and 4. Each time the timepiece movement 8 drives the first or second stepping motor 17 or 22, the three hand position counters count up such that the positions of the three hands are synchronized with their respective corresponding counted-up values. The timepiece movement 8 is controlled such that the time counter is synchronized with the three hand position counters, thereby causing the hands 2-4 of the analog display timepiece to indicate a current time.

Assume that the timepiece module 1 is placed in a high magnetic field or shocked greatly in this case, there are cases where the stepping motor 17*c* and 22*c* do not rotate even when drive pulses are applied to the stepping motors 17 and 22, or otherwise rotated excessively beyond an extent of rotation which would be brought about by the output of the drive pulses; that is, the actual positions of the hands can be different from the respective values of the hand position counters. In order to avoid such undesirable situation, the CPU of the microcomputer 35 detects the aligning state of apertures in the gears or wheels 20, 23, 25 and 27 at predetermined intervals of time in order to confirm whether the values of the hand position counters are correct. If not, the seconds, center and hour hands 2, 3 and 4 are rotated at high speeds to detect the aligning state of the apertures 21*a*, 28-30 successively, thereby detecting the actual hand positions and then the hand positions are corrected so as to be equal the respective values in the hand position counters.

Figure 8:
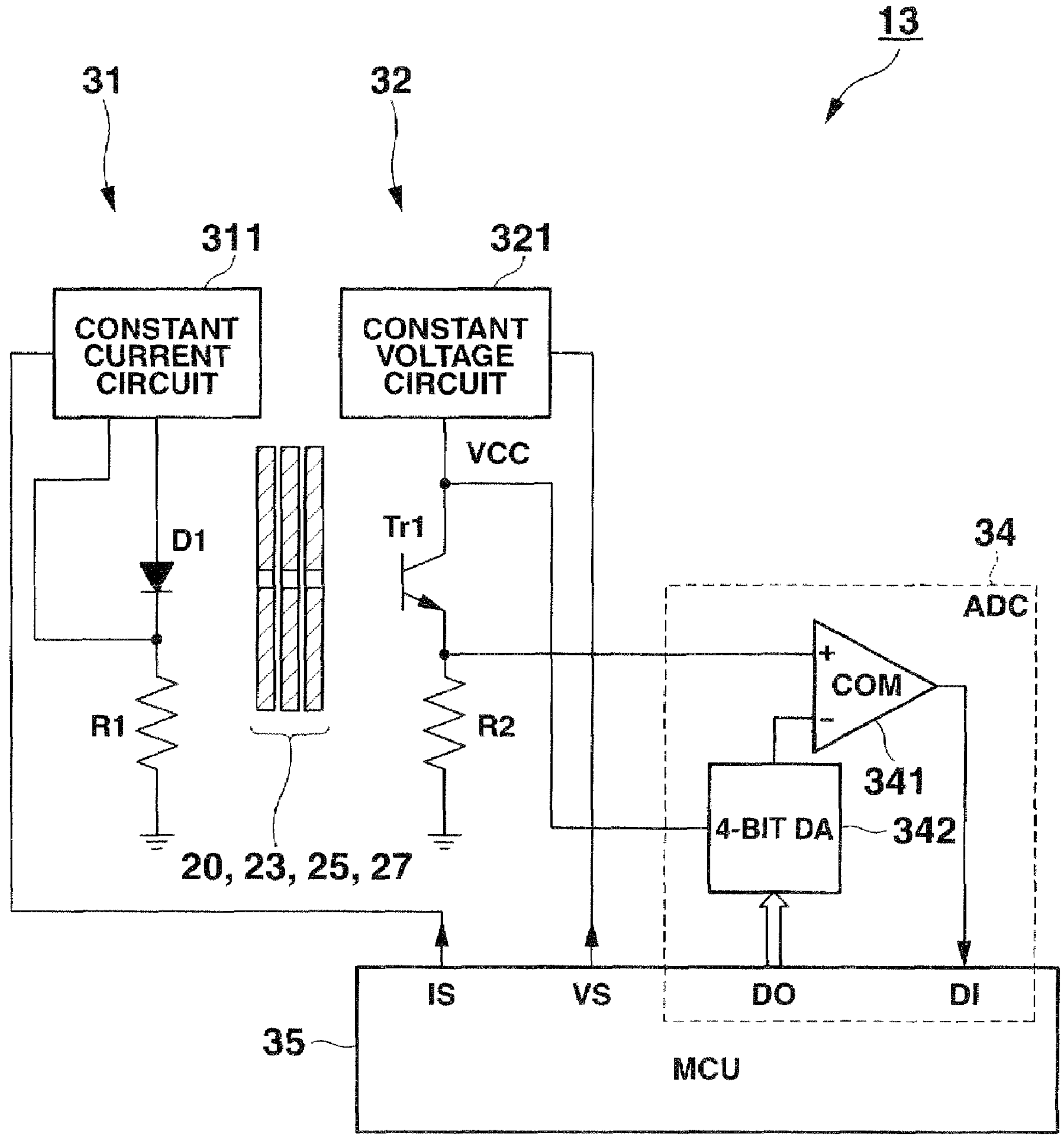
FIG. 8 illustrates a circuit configuration, indicating the details of a detection unit of FIG. 7 and its peripheral circuits which function as a through hole formation state determining device.

Referring to FIG. 8, a detailed circuit configuration of the detection unit 13 and its peripheral elements of FIG. 7 is shown. The light emission element 31 of the detection unit 13 comprises a light emitting diode D1 which emits light when the same is driven electrically, a constant current circuit 311 which provides a predetermined current to the light emitting diode D1, and a detection resister R1. When a current start signal IS from the microcomputer 35 is asserted, the constant current circuit 311 produces a current which causes the light emitting diode D1 to emit light.

The photodetection element 32 comprises a phototransistor Tr1 which receives light and produces a current depending on the strength of the light, a resister R2 which converts the current to a voltage signal, and a constant voltage circuit 321 which provides a constant voltage VCC to the phototransistor Tr1. When a voltage start signal VS outputted by the microcomputer 32 is asserted, the constant voltage circuit 321 produces a voltage output which drives the phototransistor Tr1.

The AD converter 34 is of a successively comparison type, for example, attached externally to the microcomputer 35 and comprises an analog comparator 341, and a DA converter 342, for example, of 4 bits. A successive comparison type register which stores an output from the comparator 341 in the AD conversion and a logic which controls the output from the DA converter 342 are not shown, but should be provided within the microcomputer 35. The DA converter 342 provides a comparison reference voltage depending on a constant voltage Vcc from the constant voltage circuit 321 and output data DO from the logic to an inverting input of the comparator 341. The comparator 341 compares the comparison reference voltage with an input voltage thereto and outputs a result of the comparison DI to the sequential comparison register. By repeating such comparison four times, a resulting 4-bit resolution AD conversion value is written to the successive comparison type register.

In the AD converter 34, in addition to the usual AD conversion the CPU of the microcomputer 35 switches operation of the logics and the successive comparison type register to output any digital data DO to the DA converter 342 so as to control the comparison voltage at an inverting input terminal of the comparator 341. The CPU can also read an output DI from the comparator 341 in units of one bit.

A main control process of the timepiece module 1 will be described with reference to a flowchart of FIG. 9. In the timepiece module 1, when the power supply is turned on, the CPU starts the main control process of FIG. 9, and then performs a looping process of steps S1-S4 of this process repeatedly. The step S1 includes a SW process which performs a process corresponding to a switching signal received from the operation unit 47; the step S2 a time counting process which updates the time counter as required; the step S3 a hand position detecting process which detects whether the hand positions are right; and the step S4 other function processes including a radio wave reception process and various error processes.

The SW process of the step SI includes a trimming process to be described later in detail.

Figure 9:
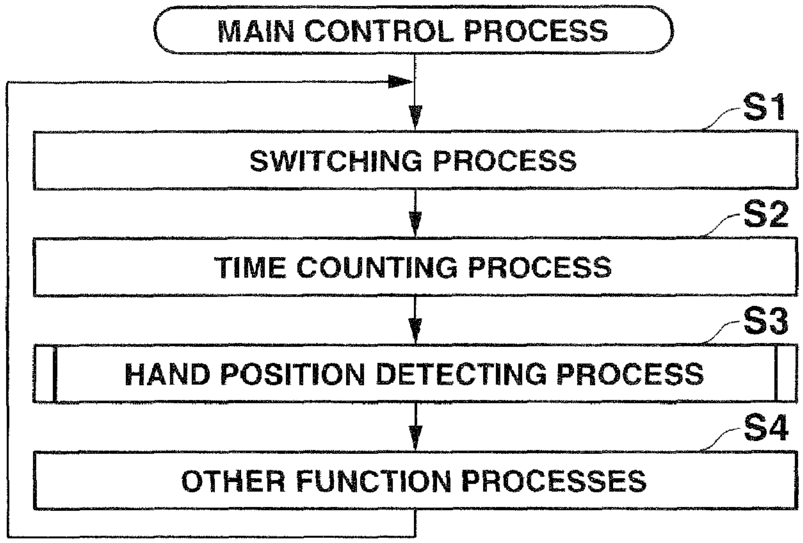
FIG. 9 is a flowchart of a main control process to be performed by a CPU of the timepiece module.
Figure 10:
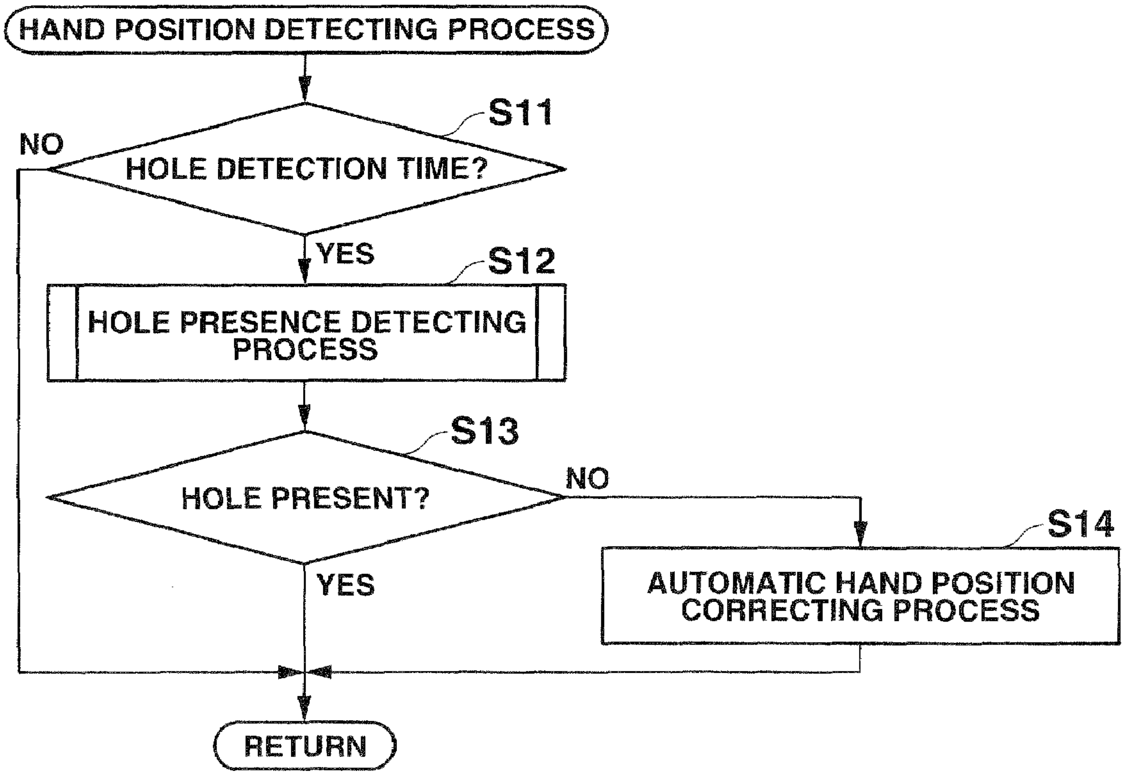
FIG. 10 is a flowchart of a hand position detecting process in a step S3 of the main control process.

FIG. 10 is a flowchart of the hand position detecting process to be performed in the step S3 of FIG. 9. The hand position detecting process involves confirming whether the apertures 21*a*, 28, 29 and 30 is formed in the gears (or hour, center, seconds and intermediate wheels 27, 25, 20 and 23) align correctly at a predetermined time at the detection position P. Otherwise, it is determined that the hands are offset from the detection position P and a process for setting the hand positions to correct positions will be performed.

In the hand position detecting process, first, it is determined whether a preset aperture detecting time has come (step S11). Otherwise, the hand position detecting process is terminated and the control returns to the main control process. If the aperture detecting time (for example, 0 o'clock 50 minutes, 1 o'clock 50 minutes, . . . , or 10 o'clock 50 minutes where the apertures 21*a*, 28-30 align at the detection position P) has come, the detection unit 13 is operated so as to perform a through hole presence detecting process which detects the presence of a through hole composed of completely or partially aligning apertures 21*a*, 28-30 (step S12). Then, a result of this detecting process is determined (step S13). If it is determined that a through hole is formed, it is determined that the hand positions are normal, thereby terminating the hand position detecting process. Otherwise, an automatic hand position correcting process is performed which corrects the hand positions (step S14), and then the hand position detecting process is terminated.

The automatic hand position correcting process is a well known technique and further detailed description thereof will be omitted. Briefly, in this process, the center and hour hands 3 and 4 are rotated at high speeds, and then the through hole presence detecting process is performed for each one-step rotation, thereby detecting the actual positions of the center and hour hands 3 and 4. Then, the seconds hand 2 is rotated at high speeds to perform the through hole presence detecting process successively, thereby detecting the actual position of the seconds hand 2. When these positions are detected, these positions are synchronized with the corresponding values in the hand position counters.

Figure 11:
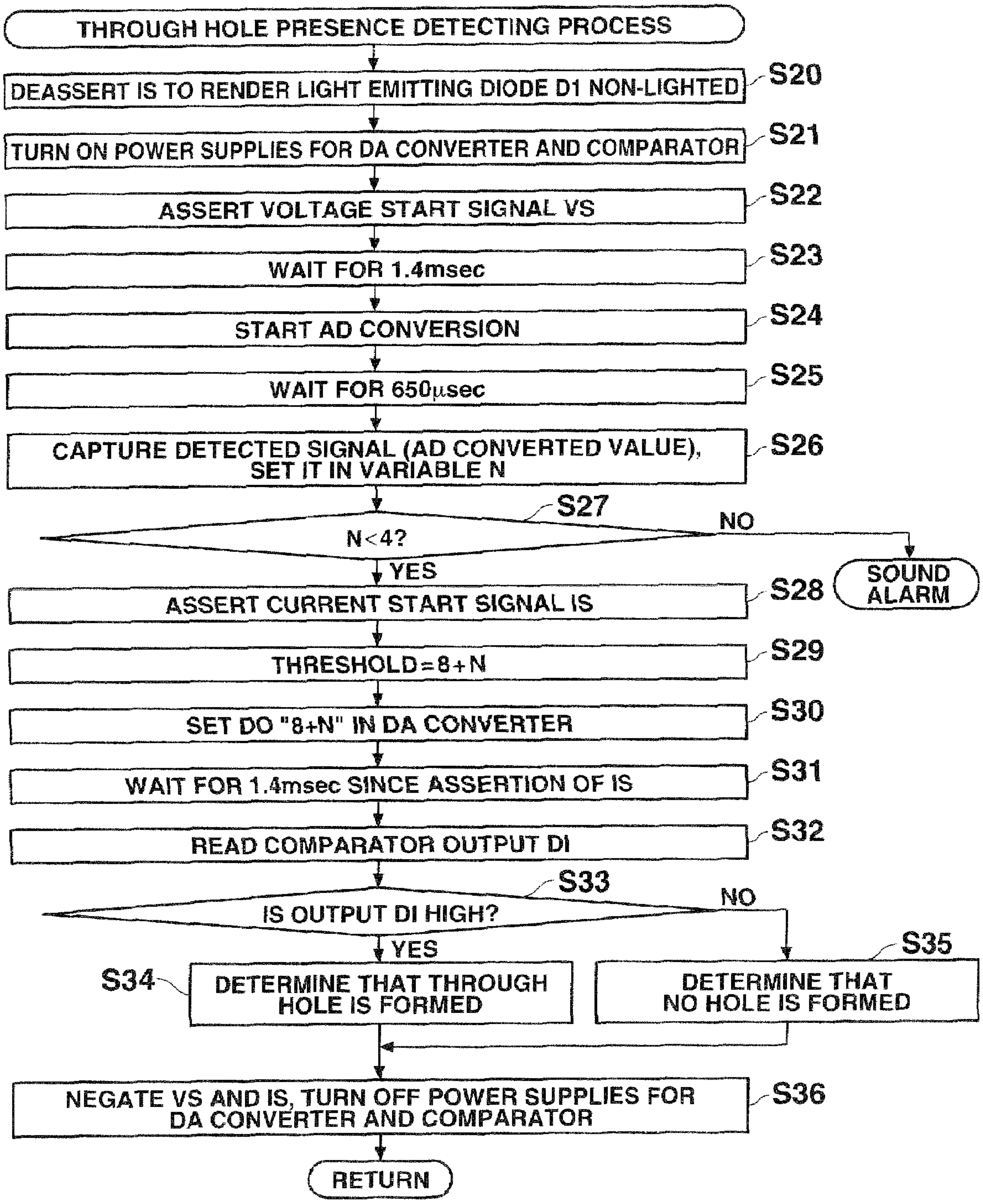
FIG. 11 is a flowchart of the details of a hole presence detecting process in a step S12 of the hand position detecting process.
Figure 12:
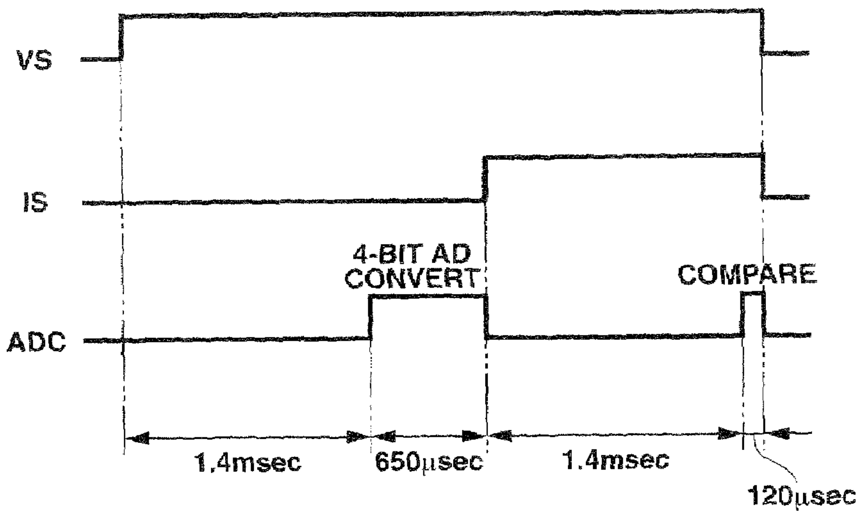
FIG. 12 shows a timing chart of an operational relationship between the light emission element and a photodetection element in the hole presence detecting process of FIG. 11.

FIG. 11 is a detailed flowchart of the through hole presence detecting process to be performed successively in the step S12 of FIG. 10. FIG. 12 is a timing chart illustrating operation of the detection unit 13 in the through hole presence detecting process.

In the through hole presence detecting process, the light emission element 31 and the photodetection element 32 of the detection unit 13 are operated; the intensity of light detected by the photodetection element 32 is compared to a threshold indicating that the apertures are aligned at the detection position P, thereby forming a maximum hole; and then it is determined based on a result of the comparison whether the apertures 21*a*, 28, 29 and 30 are aligned. In this embodiment, the threshold used is offset by an influence of external light from a predetermined threshold produced by taking into account a variation in the alignment of the apertures in the wheels due to backlash of the gears.

In this through hole presence detecting process, first, the CPU of the microcomputer 35 deasserts the current start signal IS, thereby rendering the light emitting diode D1 non-lighted (step S20). Then, the power supplies for the DA converter 342 and the comparator 341 are turned on (step S21). Then, a voltage start signal VS is asserted, thereby providing a collector voltage to the phototransistor Tr1 (step S22).

After driving the phototransistor Tr1, a predetermined time (for example, of 1.4 msec) is waited until the output of the photo-transistor Tr1 is stabilized (step S23). Then, the AD conversion is started by the AD converter 34 (step S24) and a time required for the AD conversion process is required (for example, in the case of 4-bit resolution, 650 μsec is required for four comparisons) (step S25). Then, an AD conversion output from the AD converter 34 is read and set into a variable N (step S26). That is, in the process of the steps S21-S26, the output from the photodetection element 32 when the light emission element 31 is not driven is stored in the variable N, which represents a received intensity of the external light entering the timepiece.

After the variable N is set, it is then determined whether the value of the variable N is an error value (for example, smaller than "4") (step S27). If so, it is informed, for example by an alarm, that the intensity of the external light is excessively high. Then, the through hole presence detecting process is terminated and the control returns to the original flow. The error value indicates that the intensity of the external light is excessively high. In this case, the output of the phototransistor Tr1 will be saturated when light from the light emitting diode D1 adds. Thus, the difference in the output of the phototransistor Tr1 between when a through hole is formed and when no through hole is formed is small. This renders difficult determination of the presence of a through hole because other factors which will bring about variations in the output of the phototransistor Tr1 may add. Thus, when the received intensity of the external light is higher than a predetermined value, subsequent processes to determine the presence of an aperture are omitted and the current process will be handled as an error.

When it is determined in the step S27 that the value of the variable N is a normal one, the control passes to a next step to determine the presence of an aperture. To this end, first, the electric-current start signal IS is asserted to light the light emitting diode D1 (step S28).

Next, a new threshold is produced by changing a preset threshold, which is used to determine the presence of a through hole, by the intensity of the external light (step S29). For example, if the threshold is "8" when there is no external light, a new threshold "8+N" is formed which is offset by the value of the variable N obtained in the step S26. Then, the threshold "8+N" is set as data in the DA converter 342 through the DO port from the microcomputer 35 (step S30).

Then, for example, 1.4 msec is waited which is required from the lighting of the light emitting diode D1 to stabilization of the output of the phototransistor Tr1 (step S31). Then, when the output from the phototransistor Tr1 is stabilized, the output DI from the comparator 341 is directly read (step S32).

When the step S32 is performed, it is assumed that a DA converted voltage of the offset threshold value is applied to the inverting input terminal of the comparator 341 and that the output voltage from the phototransistor Tr1 is applied to the non-inverting input terminal of the comparator 341. Thus, the output DI from the comparator 341 indicates a result of comparison between the offset threshold and the output from the phototransistor Tr1 when the light emitting diode DI is lighted.

Then, a diverging process depending on the output DI is performed (step S33). If the output DI is high, it is determined that a through hole is formed (step S34). If the output DI is low, it is determined that there is no hole (step S35). Then, the start signals VS and IS are negated, thereby stopping the driving of the light emitting diode DI and the phototransistor Tr1 and turning off the power supplies for the DA converter 342 and the comparator 341. Then, the through hole presence determining process is terminated (step S36).

As shown by ADC in a timing chart of FIG. 12, the AD converting process performed in the steps S24 and S25 required 650 μsec because the comparator 341 needed four comparison processes. In contrast, the comparing process performed by the comparator 341 in the step S32 required a reduced time of 120 μs because this process was performed only once.

While, for example, described in greater detail later in a second embodiment, comparison between the offset threshold and the value of the phototransistor Tr1 when the light emitting diode DI is lighted may be performed in a process other than that involving the steps S30-S33. For example, an output from the phototransistor Tr1 when the light emitting diode DI is lighted may be AD converted to a digital value, which may then be captured and compared with the offset threshold in the logic operation by the CPU. However, in this case, this process requires 650 μsec of the AD conversion process to capture the output from the phototransistor Tr1 as the digital value when the light emitting diode DI is lighted. In this AD conversion process, the light emitting diode D1 is required to continue to light up. Thus, if this lighting-up period is reduced, power consumption will be reduced greatly. In this embodiment, the comparator 341 performs comparison between the threshold value and the output from the phototransistor Tr1 only once when the light emitting diode D1 is lighted. Thus, the lighting period and the power consumption are reduced. Further, since the circuit of the AD converter 34 is used as the comparator 341 and the DA converter 342 which outputs a comparison reference voltage, the number of circuits used is reduced.

The above-mentioned time reduction is from 650 to 120 μsec. Only a single through hole-presence detecting process does not bring about a time reduction such as the user's sensation can recognize. However, in the automatic hand position correcting process (FIG. 10, step S14) in which the hole presence detecting process is repeated successively, such short time reductions are accumulated many times, so that the time required from the start to the end of the automatic hand position correcting process is reduced to such an extent that the user's sensation can recognize. In addition, the moving speeds of the timepiece hands in this case are increased.

Figure 13:
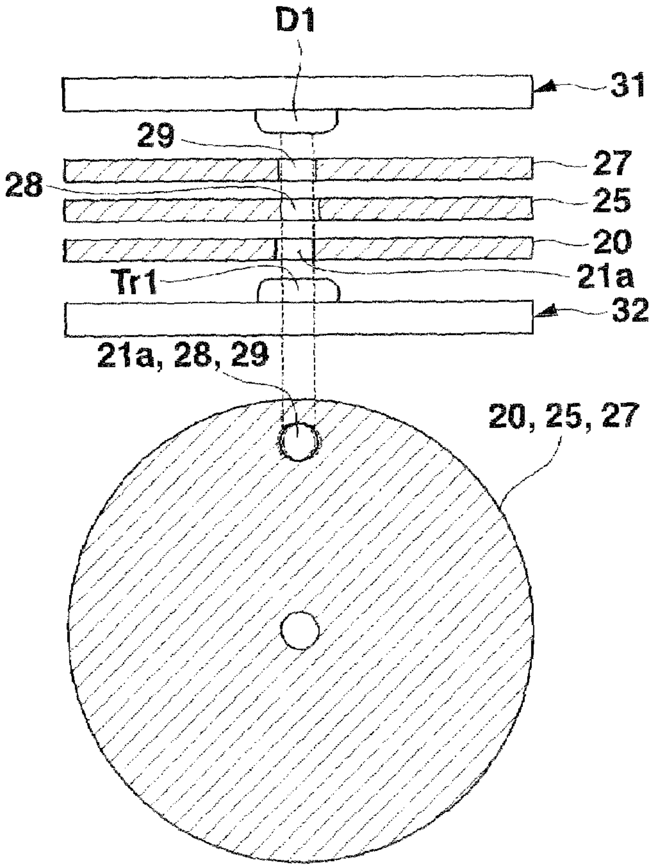
FIG. 13 illustrates a state where it is determined in the hole presence detecting process that a hole is formed.
Figure 14:
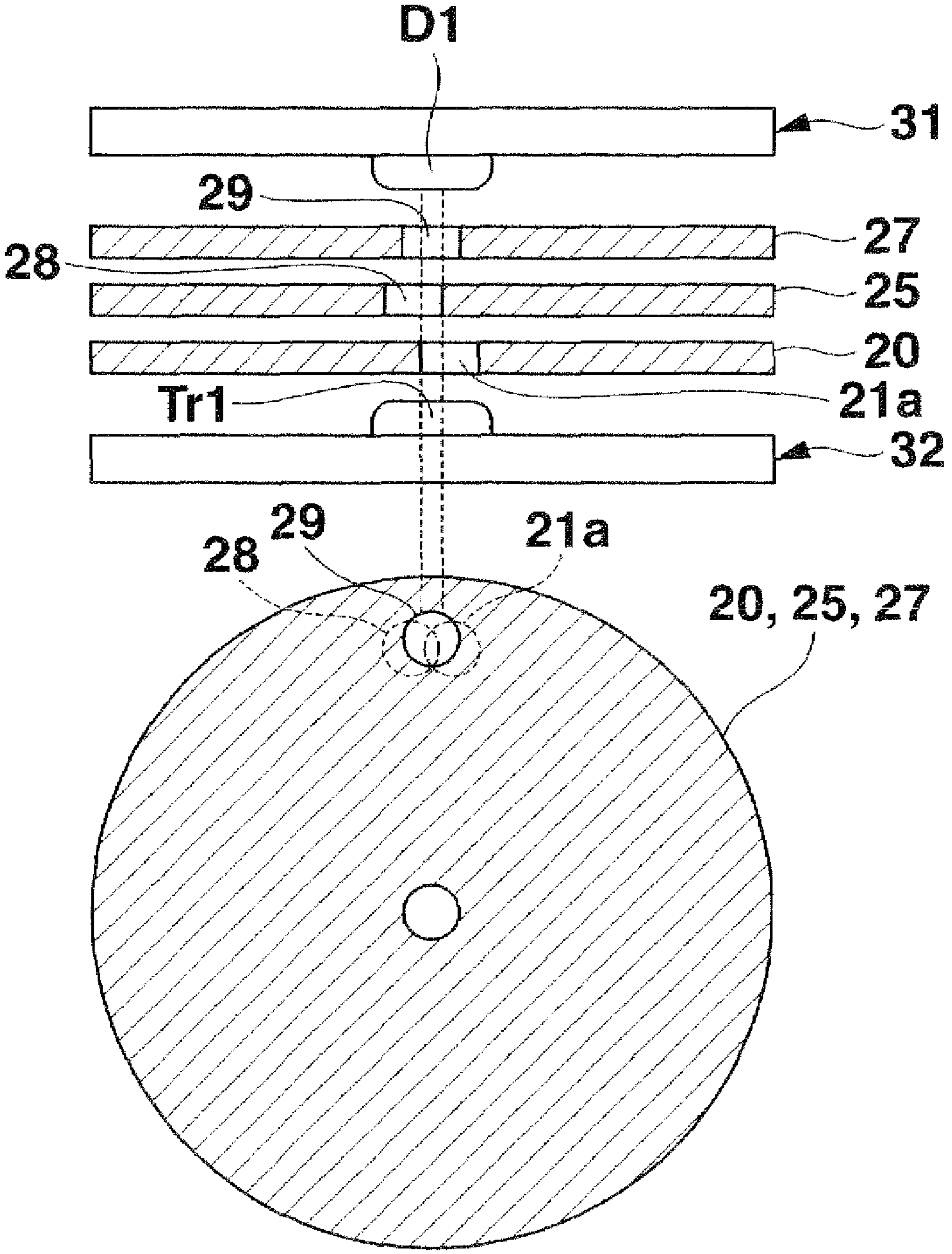
FIG. 14 illustrates a state where it is determined in the hole presence detecting process that no hole is formed.
Figure 15:
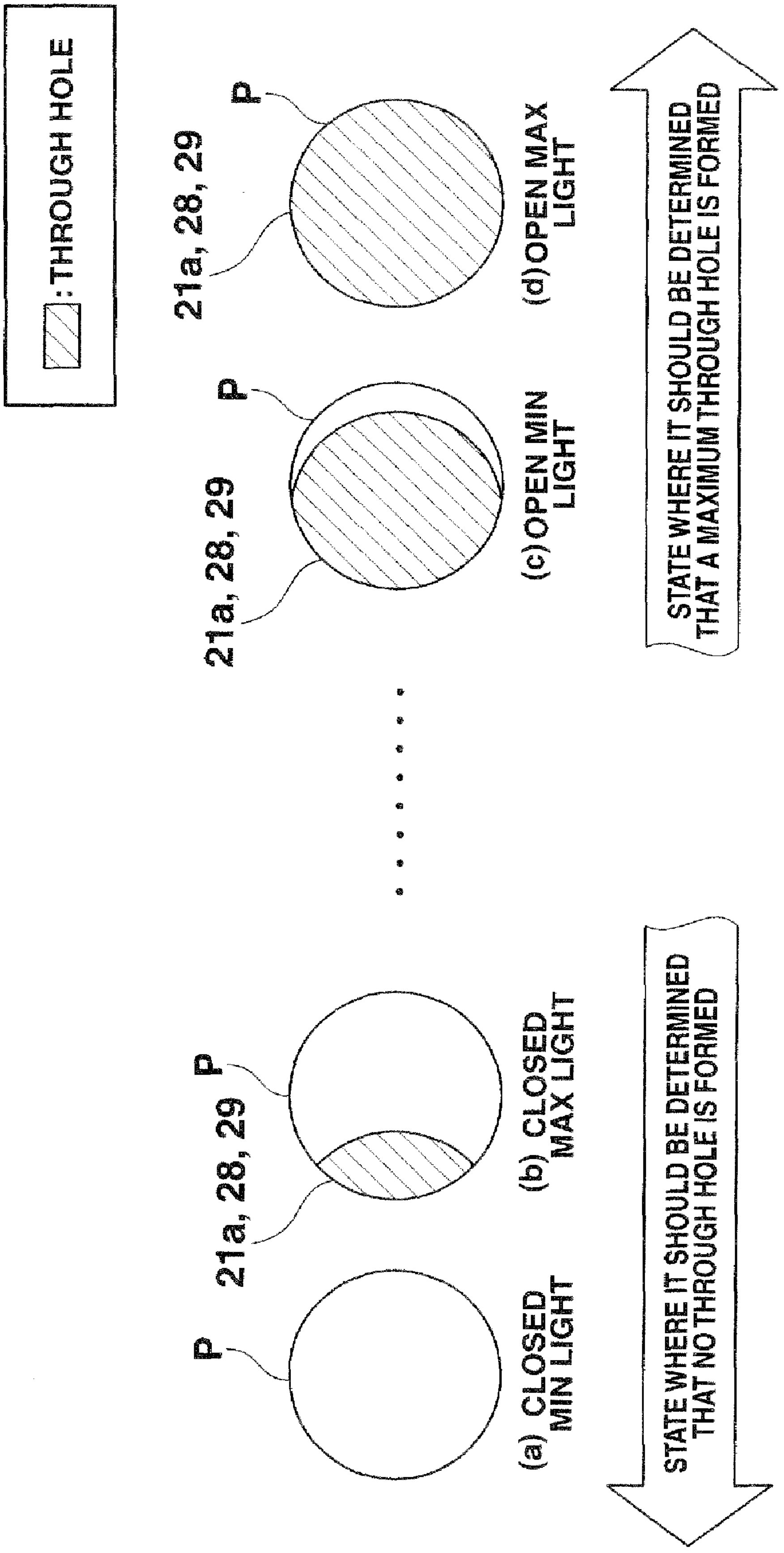
FIG. 15 illustrates the size of a hole changing depending on a measurement of the backlash of the gears included.

The details of the threshold value will be described next. FIGS. 13 and 14 illustrate a complete alignment and a non-alignment of the apertures, which are determined as through holes being formed and not formed, respectively, in the through hole presence detecting process. FIG. 15 illustrates variations in the aligning state of the apertures to be determined as through holes being formed (or open) and not formed (or closed). FIG. 13-15 illustrate only the apertures 20*a*, 28 and 29 in the seconds, center and hour wheels 20, 25 and 27 with the aperture 30 in the intermediate wheel 23 not shown, but a similar situation occurs even when the intermediate wheel 23 is included.

Generally, there is backlash among the meshing gears (seconds, center and hour wheels 20, 25 and 27). Thus, even when the respective wheels are each rotated in a predetermined number of steps by the stepping motors 17 and 22, the corresponding amounts of rotation of the wheels will each probably involve an error due to backlash compared to those obtained when there is no backlash. Thus, as shown in FIG. 13, even in the rotational steps of the seconds, center and hour wheels 20, 25 and 27 where their apertures 20*a*, 28 and 29 should wholly align originally at the detection position P, the seconds, center and hour wheels 20, 25 and 27 can slightly offset from the detection position P in the rotating or anti-rotating direction and hence the overlapping area of the apertures can be reduced.

As shown in FIG. 14, when the wheels 20, 25 and 27 are arranged in a state where their apertures 20*a*, 28 and 29 barely overlap in the rotational steps thereof, these apertures can be caused to overlap slightly when one or more of the wheels 20, 25 and 27 are slightly rotated in the driving or anti-driving direction due to backlash, thereby forming a small through hole between the light emission element 31 and the photodetection element 32.

More particularly, as shown by (a) closed MIN light and (b) closed MAX light in FIG. 15, even when it should be determined in the rotational steps of the wheels 20, 25 and 27 that no through hole is formed between the light emission element 31 and the photodetection element 32, a through hole formation state varies from the state of (a) in FIG. 15 where no through hole is formed to the state of (b) in FIG. 15 where a maximum small through hole is formed due to the apertures 20*a*, 28 and 29 overlapping slightly due to the backlash. In the state of (a) in FIG. 15, the intensity of light which the photodetection element 32 receives from the light emission element 31 is minimum or 0 (hereinafter referred to as "closed MIN light"). In the state of (b) in FIG. 15, the intensity of light which the photodetection element 32 receives from the light emission element 31 is maximum due to the backlash (hereinafter referred to as "closed MAX light") in the rotational steps of the wheels 20, 25 and 27 where it should be determined that no through hole is formed.

As shown by (c) open MIN light and (d) open MAX light in FIG. 15, even in the rotational steps of the wheels 20, 25 and 27 where it should be determined that a through hole is formed, the through hole formation state varies from the state of (c) in FIG. 15 where the apertures 20*a*, 28 and 29 do not wholly align due to the backlash to the state of (d) in FIG. 15 where all the apertures 20*a*, 28 and 29 completely align. In the state (d) in FIG. 15, the intensity of light which the photodetection element 32 receives from the light emission element 31 is maximum (hereinafter referred to as "open MAX light"). In the state of (c) in FIG. 15, the intensity of light which the photodetection element 32 receives from the light emission element 31 is minimum due to backlash (hereinafter referred to as "open MIN light") in the rotational steps of the wheels 20, 25 and 27 where it should be determined that a maximum complete through hole is formed.

A variation in the intensity of the detected light due to the backlash among the wheels is not so large because the wheels rotate in units of a step. A variation in the intensity of the detected light is not only due to the backlash. It is also due to a variation in the characteristics of each of the light emitting diode D1 or phototransistor Tr1, as well as a variation in the driving current or voltage based on fluctuations in the battery voltage. However, there is no great difference in intensity between the "closed MAX light" and the "open MIN light" obtained by taking into account the worst factors of those variations.

The detection unit 13 is required to discriminate between the "closed MAX light" and the "open MIN light" obtained by taking the various variations into account. The above-mentioned threshold is set at the boundary between the detected outputs of the "closed MAX light" and the "open MIN light". By comparing this threshold with the intensity of the received light, it can be determined whether the detected light is the "closed MAX light" or the "open MIN light". The threshold is the above-mentioned preset value "8". In the timepiece module 1 of this embodiment, this threshold value is set and stored, for example, in the ROM 36 before the articles are shipped from a factory. Alternatively, the threshold may be set in a trimming process to be described later when the articles are shipped from the factory or later.

Figure 16:
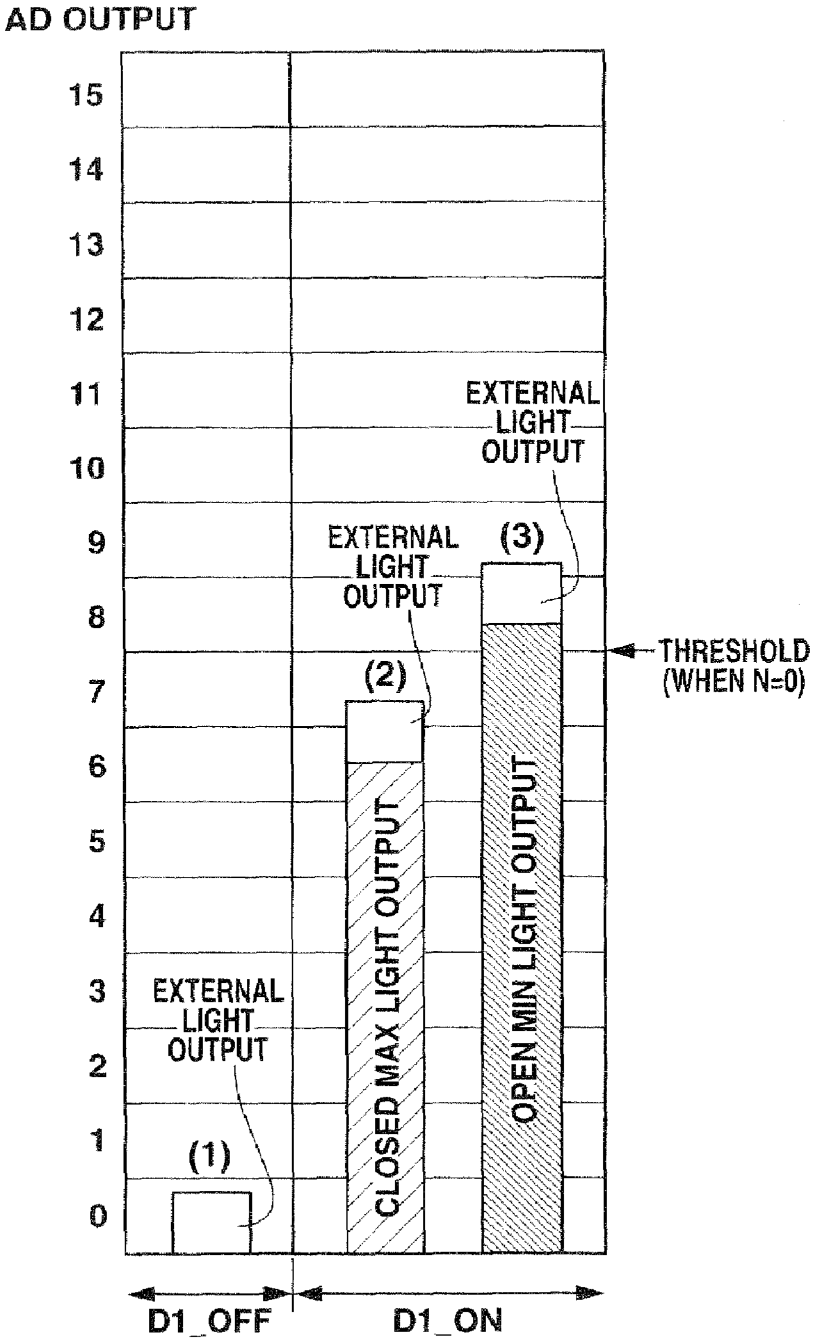
FIG. 16 is a graph illustrating one example of a relationship between a sensor output and a threshold in the hole presence detecting process.
Figure 17:
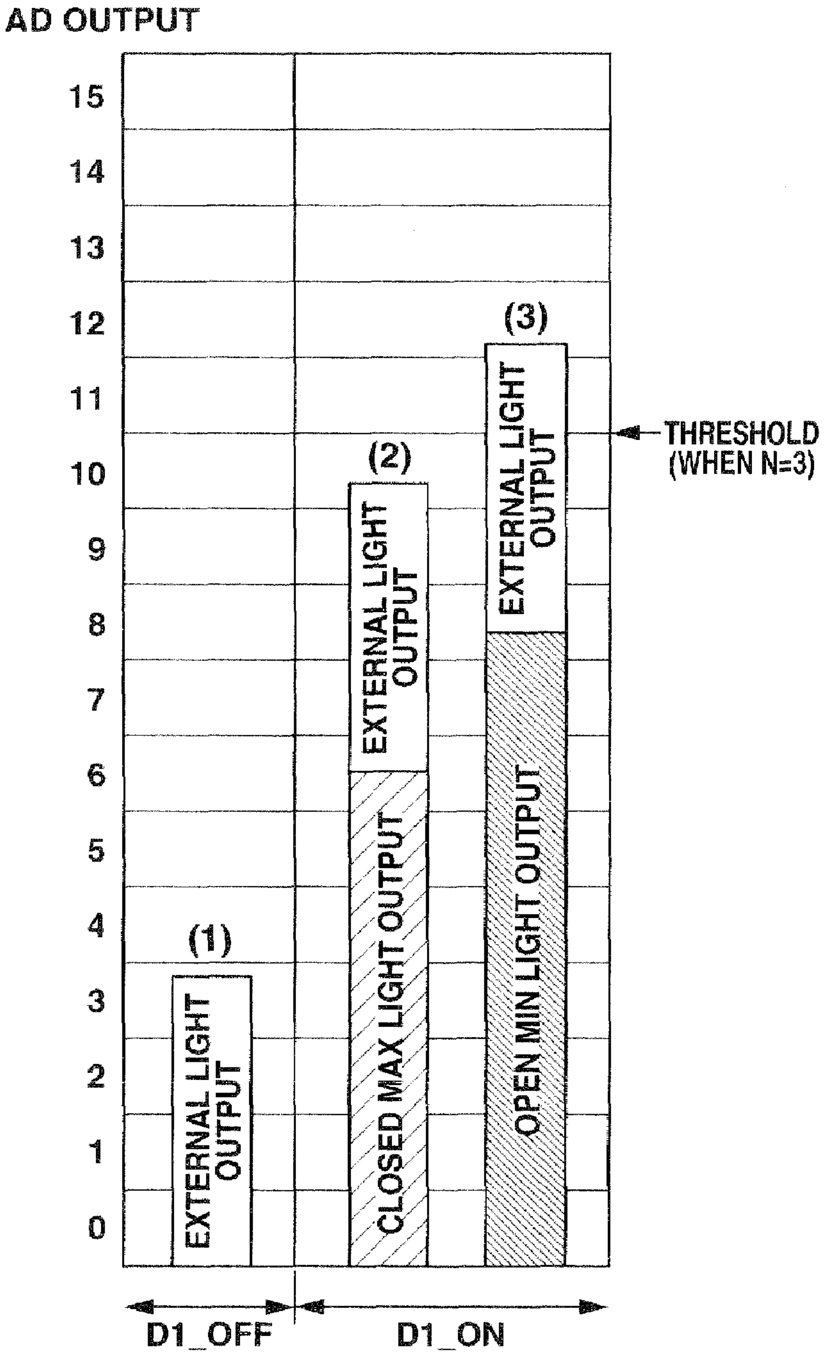
FIG. 17 is a similar graph to FIG. 16.

FIGS. 16 and 17 illustrate graphs of first and second examples of sensor outputs and a threshold in the hole presence detecting process. In these Figures, a section "D1_OFF" involves an output of the photodetection unit 32 when the light emitting diode D1 is off and a section "D1_ON" involves the output of the photodetection element 32 when the light emitting diode D1 is on. Shown in a left side within the section "D1_ON" is a worst pattern of a signal outputted from the photodetection element 32 when no through hole is formed. Shown in a right side within the section "D1_ON" is a worst pattern of a signal outputted from the photodetection element 32 when a through hole is formed.

First, referring to FIG. 16, assume that a quantity of external light is small, and that its AD converted value (or the value of the variable N acquired in the step S26 of FIG. 11) is, for example, "0". In this case, we have a worst pattern in which no through hole is formed, as shown by a left lower bar within the section D1_ON in FIG. 16, which shows that the photodetection element 32 receives the "closed MAX light", and outputs a detected signal having a strength of "6" or "7" of an AD converted value. The output from the photodetection element 32 includes the sum of the "closed MAX light" and the external light. On the other hand, as shown by a right higher bar within the section D1_ON in FIG. 16, assume that we have a worst pattern in which a small hole is formed and that the photodetection element 32 only receives the "open MIN light". In this case, a detected signal from the photodetection element 32 has an intensity of "8" or "9" of an AD converted value. That is, the output from the photodetection element 32 includes the sum of the "open MIN light" and the external light.

Thus, in this case, since the value of the variable N is "0", it can be determined whether a through hole is formed, by comparing the original threshold value "8" with the intensity of the signal from the photodetection element 32 without offsetting the original threshold value "8".

Next, referring to FIG. 17, assume that there is a relatively large amount of external light and its AD converted value (or the value of variable N) is, for example "3", and that a worst pattern appears in which no through hole is formed, but the photodetection element 32 receives "closed MAX light", as shown by a lower left bar within a section D1_ON of FIG. 17. A detected signal from the photodetection element 32 has an intensity of "9" or "10" of an AD converted value, which is the sum of the "closed MAX light" and the external light. On the other hand, as shown by a higher right bar within the section D1_ON of FIG. 17, when a worst pattern appears in which a small through hole is formed and the photodetection element 32 only receives the "open MIN light", a detected signal from the photodetection element 32 has an intensity of "11" or "12" of an AD converted value, which includes the sum of the "open MIN light" and the external light.

Thus, in this case, the threshold is offset by "3" indicative of the value of the variable N, thereby providing a new threshold "8+3=11", which is then compared with the intensity of a signal from the photodetection element 32 to determine whether a through hole is formed. Unless the threshold is offset by the intensity of the external light, a result of normal determination as to whether the hole is formed cannot be obtained as the case may be. By offsetting the threshold by the intensity of the external light, a result of normal determination as to whether the hole is formed is obtained even when the "closed MAX light" output is close to the "open MIN light" output.

As shown in the step S27 of FIG. 11, when the intensity of the external light is excessively large in the timepiece module 1 of this embodiment (N≧4), there is a possibility that the output of the photodetection element 32 will be saturated, thereby failing to maintain a linear relationship between the quantity of received light and the detected output, as shown in FIGS. 16 and 17. In order to avoid such situation, this processing is handled as NG and no determination will be made. However, unless a saturated output of the photodetection element 32 such as described above is produced due to the quantity of received light and/or the characteristics of the phototransistor Tr1, the determination as to whether a through hole is formed can be made similarly even when N≧4.

Figure 18:
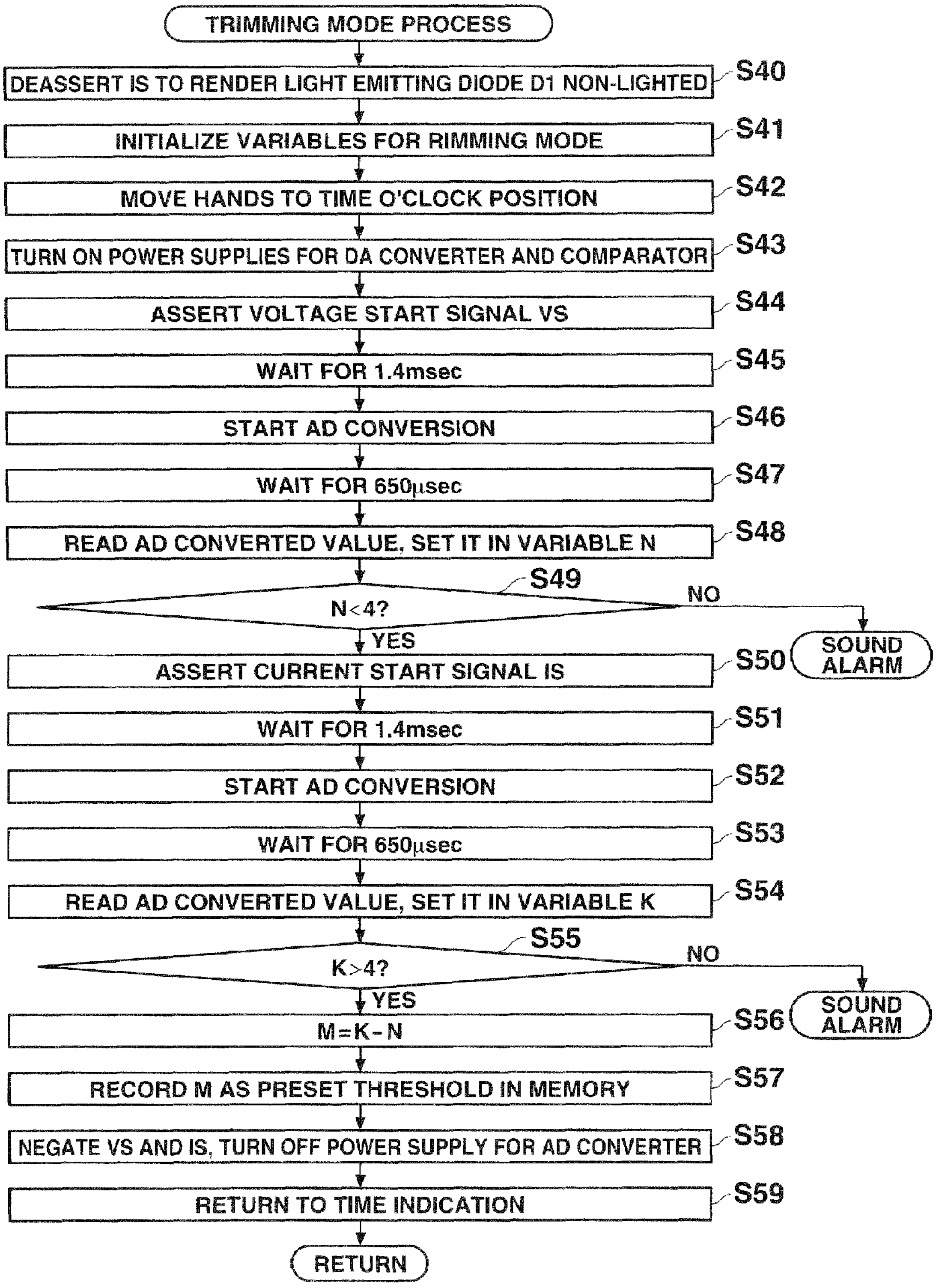
FIG. 18 is a flowchart of a trimming mode process to be performed when a predetermined switch is operated in the main control process.

Next, referring to FIG. 18, a description is made of the trimming mode process to be performed when a predetermined switching operation is made in the switching process in a step S1 of FIG. 9 of the main control process.

This trimming mode process is performed when, for example, it is known that the hands are not offset before the timepieces are shipped from a factory. This process is started by operating a special button which is not known to a user. Alternatively, this process may be performed by the user or automatically when there are no offsets of the hand positions, for example, immediately after the hands are determined as being at correct positions in the hand position detecting process or immediately after the hand position correcting process is completed.

The trimming mode process includes automatically setting in each timepiece module 1 an optimal threshold before offset by the intensity of the external light and compared with the output of the photodetection element in the through hole presence detecting process.

Generally, the characteristics of a plurality of timepiece modules 1 vary individually because the characteristics of the light emitting diodes D1 and phototransistors Tr1 of the respective timepiece modules vary. The characteristics of the constant current circuits 311 or the constant voltage circuits 321 vary because the characteristics of their components vary. These variations appear among the timepiece modules 1, but no characteristics of each timepiece module vary with time. Thus, by setting a threshold so that the influence of the characteristic variations is removed in the trimming mode process, the characteristic variation which influences the "closed MAX light" and "open MIN light" intensities obtained by taking the characteristic variations into account can be eliminated from the "closed MAX light" and "open MIN light" intensities. Thus, the difference between the "closed MAX light" and "open MIN light" intensities increases, thereby achieving an improved hole presence determination. In other words, use is made of the "closed MAX light" and the "open MIN light" due to only the backlash in the gears and not due to the variations in the characteristics of the components of the light emitting diodes D1 and the phototransistors Tr1. Thus, the difference between the "closed MAX light" and the "open MIN light" increases, thereby facilitating to calculate a threshold set at a boundary between the "closed MAX light" and the "open MIN light".

As shown in FIG. 18, when this trimming mode process starts, the CPU of the microcomputer 35 deasserts the current start signal IS, thereby turning off the light emitting diode D1 (step S40). Then, the various variable values are initialized for the trimming mode (step S41) and the gears (hour, center, seconds and intermediate wheels 27, 25, 20 and 23) are rotated, thereby moving the seconds, center and hour hands 2, 3 and 4 to a related time o'clock position where the apertures 21*a*, 28, 29 and 30 align, and stopping them there.

Then, in order to detect the intensity of the external light, the power supplies for the DA converter 342 and the comparator 341 are turned on sequentially without driving the light emitting element 31 (step S43). A voltage start signal VS is then asserted (step S44), and 1.4 msec is waited to stabilize the output of the phototransistor Tr1 (step S45). Then, the AD converter 34 is caused to perform the AD conversion (step S46); 650 μsec is waited for the AD conversion (step S47); and a result of AD conversion is read and set into the variable N (step S48).

Then, in order to handle as an error a case in which the external light is excessively large, it is determined whether the value of the variable N is an excessive value (N≧4) (step S49). If so, an NG is displayed and the control returns to the original process. If the value of the variable N is not excessively large, the control proceeds to a next process.

In this process, in order to obtain the intensity of light received by the photodetection element 32 from the light emission element 31 when the same is driven, the electric-current start signal IS is asserted, thereby turning on the light emitting diode D1 (step S50). Then, 1.4 msec is waited to stabilize the output of the phototransistor Tr1 (step S51) and the AD converter 34 is caused to start to perform the AD conversion (step S52). Then, 650 μsec is waited for the AD conversion (step S53) and a result of the AD conversion is read and set in the variable K (step S54).

Then, in order to handle as an error a case in which the intensity of the detected light is excessively small, it is determined whether the value of the variable K is excessively small, or smaller than 4 (step S49). If so, this case is handled as NG and the control returns to the original process. Otherwise, the control proceeds to a next process.

If the values of the variables N and K acquired are normal ones, a new threshold M to be set is calculated from these values of the variables K and N (step S56). For example, the threshold of M is calculated from a function "M=K−N". If it can be considered that the difference between the "closed MAX light" and the "open MIN light" increases to some extent, the threshold value can be set to a little smaller value such as, for example, "M=K−N−1" or "M=K−N−2", as required.

The threshold value M obtained is then written into a predetermined area of a memory so as to be usable in the hole presence detecting process (step S57), thereby completing the setting of the new threshold value. Then, operation of the light emission element 31 and the photodetection element 32 is stopped (step S58) and a process is performed for returning the timepiece hands stopped so far to a current time display (step S59), thereby terminating the trimming mode process. Then, the control returns to a next step of the main control process.

In such trimming mode process, even when a light emitting diode D1 and a phototransistor Tr1 each of a relatively large margin of error are used, a correct determination as to whether a through hole is formed can be made. Thus, the part costs are reduced. If the trimming mode process is performed each time it is determined that the hand positions are correct in the hand position detecting process, the light emitting diode D1 or the phototransistor Tr1 can be driven with the battery voltage and resisters with the constant current and voltage circuits 311 and 321 of the detection unit 13 omitted. Even when the battery voltage varies with time, thereby changing the light emitting intensity of the light emitting diode D1 and the receiving characteristic of the phototransistor Tr1, these changes can be trimmed in the trimming mode process and a threshold can be set and used which brings about always correct detection of the presence of a through hole.

If it has been determined that the trimming mode process should be performed always in a dark place, the process for detecting the external light in the steps S45-S49 can be omitted, thereby setting the intensity of the external light to 0.

Second Embodiment

Figure 19:
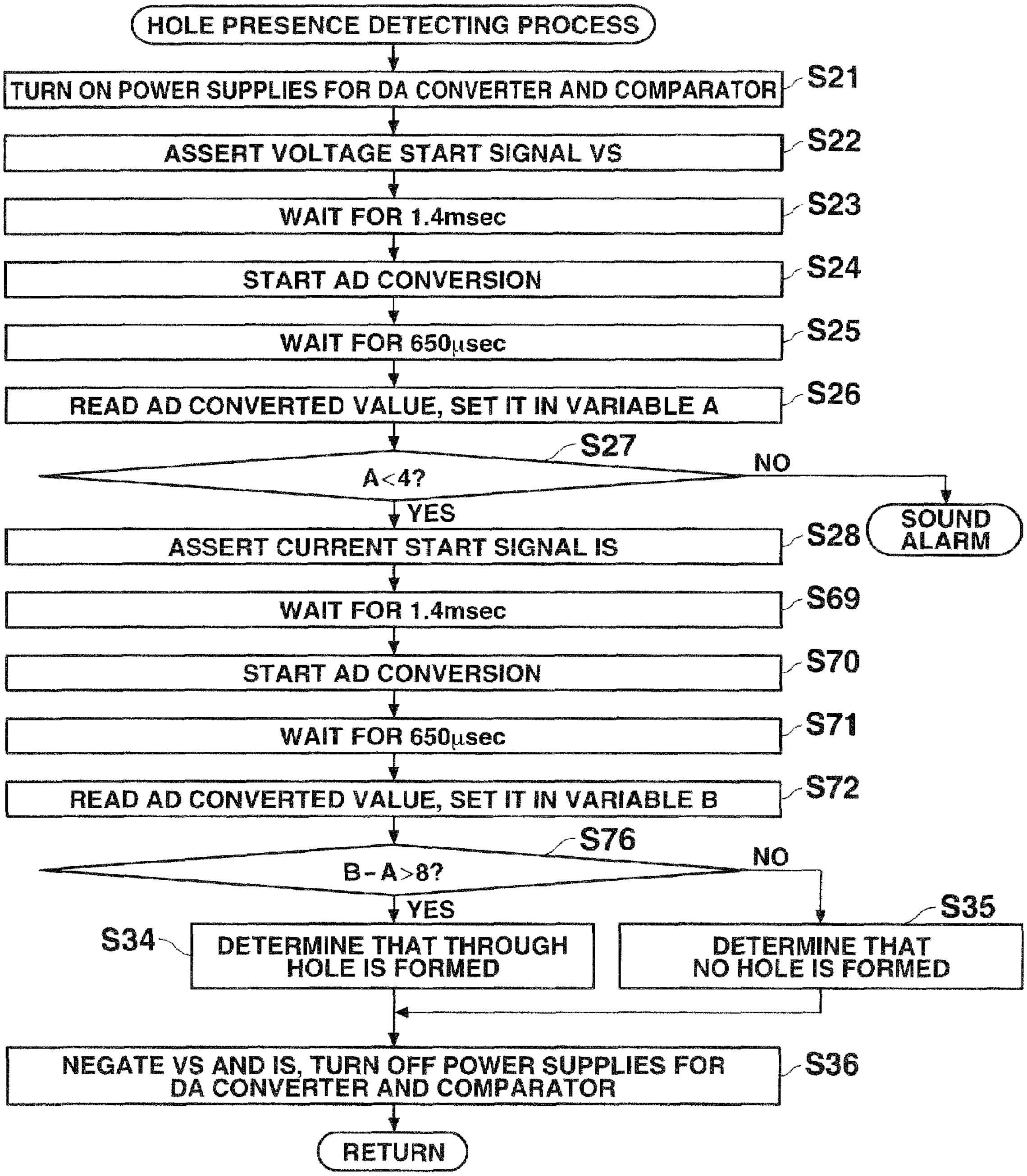
FIG. 19 is a flowchart of another form of the hole presence detecting process.
Figure 20:
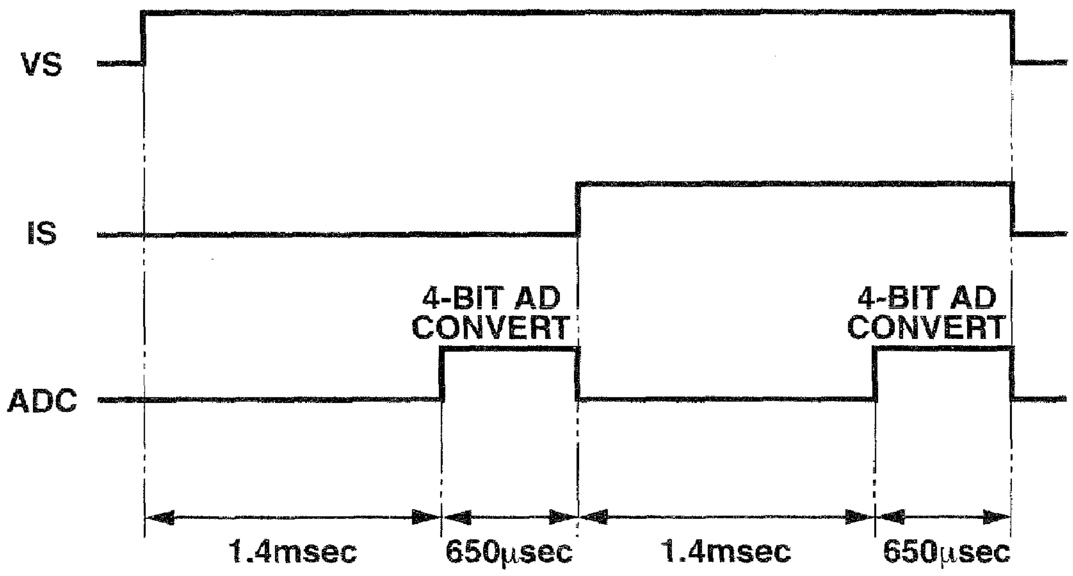
FIG. 20 shows a timing chart illustrating an operational relationship between the light emission element and the photodetection element in the hole presence detecting process of FIG. 19.

FIG. 19 is a flowchart of a second embodiment of the hole presence detecting process. FIG. 20 is a timing chart indicative of operation of the detection unit 13 in the hole presence detecting process.

The hole presence detecting process of the second embodiment is partly different from the first embodiment. Thus, different points of the second embodiment from the first embodiment will be mainly described. The second embodiment performs the same steps S21-S28 as the first embodiment (FIG. 11). In these steps, the output from the photodetection element 32 is read, thereby acquiring the received intensity of the external light, and then the light emission element 31 is driven.

In the hole presence detecting process of the second embodiment, after the light emission element 31 is driven, the following process is performed; that is, like in the external light detecting process, 1.4 msec is waited for the output of the phototransistor Tr1 to be stabilized (step S69); the AD converter 34 is caused to start its AD conversion (step S70); then 650 μsec for the AD conversion is waited (step S71); an AD converted value is read from the AD converter 34; and this value is set in the variable B as the intensity of light received from the light emission element 31 when the same is driven (step S72).

Then, the intensity of the received light (or the value of the variable B) is offset by the intensity of the external light (or the value of the variable A). Then, a resulting value is compared with a threshold (,for example, of "8") (step S76). If the offset intensity ("B−A") is greater than the threshold, it is determined that a through hole is formed (step S34). Otherwise, it is determined that no hole is formed (step S35). Then, a post-process is performed (step S36) and the hole presence detecting process is terminated.z As just described above, the intensity of light received from the light emission element 31 when the same emits light is also converted by the AD conversion to a digital value, which is then offset by the intensity of the external light, and then a resulting value is compared with the threshold in the logic operation, thereby detecting the presence of a through hole.

As will be known by comparison between the timing charts of FIGS. 20A-20C and 12A-12C, in the hole presence detecting process of the second embodiment the time required for a single hole-presence detecting process is approximately 500 μs longer than in the first embodiment in order to perform AD conversion on the intensity of light received from the light emission element 31 when the same is caused to emit light. This period of approximately 500 μs involves assertion of the electric-current start signal IS and driving the light emitting diode D1. Thus, the consumed current is increased. In view of these points, the first embodiment can be said to be advantageous over the second embodiment. However, use of the converter 34 which is not of the successive comparison type AD, but of the type which has the function of performing an AD conversion in one clock cycle can solve the difficulty with the second embodiment.

The threshold "8" indicated in this embodiment has a similar meaning to that explained with reference to FIGS. 13-17 in the first embodiment and this threshold can be set in each timepiece module in the trimming mode process as in the first embodiment. While in the second embodiment it is illustrated that the intensity of light received from the light emission element 31 (or the value of the variable B) is offset by the intensity of the received external light, the threshold "8" may instead be offset by the value of the variable A, thereby comparing a resulting value with the value of the variable B. That is, a comparison "B>8+A" may be performed to obtain the same result.

While the first and second embodiments are illustrated above, the configuration of the gears or wheels which rotate the hands, and the arrangement and number of apertures in the gears or wheels, indicative of the positions of the hands attached to the gears or wheels may be changed, as required. The apertures in the gears may be filled with a transparent material. While in the embodiments it is illustrated that the light emission element and the photodetection element are disposed in opposed relationship with the gears or wheels in between, a relationship in arrangement between the light emission element and the photodetection element is changed as required, for example, if light emitted by the light emission element is guided through the apertures in the gears to the photodetection element, using a mirror or an optical fiber.

While in the first embodiment it is illustrated that the comparing process for the intensity of the received light is performed using the comparator 341 and DA converter 342 of the AD converter 34, the comparing process may be performed by an analog comparator and a DA converter, separate from the AD converter 34.

While in the embodiments application of the through hole formation determining device of the present invention to detection of the hand positions of the timepiece module is illustrated, the invention is applicable similarly to various other devices which detects whether a through hole is formed at a predetermined position, thereby detecting the state of the moving members.

Various modifications and changes may be made thereunto without departing from the broad spirit and scope of this invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

What is claimed is:

1. A through hole formation state determining device comprising a light emission element which emits light when electrically driven, at least one moving member with an aperture through which light can pass, and a photodetection element which detects light from the light emission element, thereby outputting a detected signal indicative of the intensity of the detected light, the light emission element and the photodetection element being disposed at such positions that when the aperture in the at least one moving member aligns with a predetermined position, light from the light emission element passing through the aperture to the photodetection element, the through hole formation state determining device being further comprising:

external light intensity setting means for capturing a detected signal from the photodetection element when the light emission element is in a non-emission state and for setting the measurement of the detected signal as the intensity of the external light; and determining means for capturing a detected signal from the photodetection element when the light emission element is in a light emission state after the intensity of the external light is set by the external light intensity setting means, for offsetting a threshold to be compared with the detected signal by the intensity of the external light, for comparing the offset threshold with the value of the detected signal, and for determining in accordance with a result of the comparison whether the aperture in the at least one moving member is at the predetermined position.

2. The through hole formation state determining device of claim 1, wherein the external light intensity setting means comprises:

an AD converter for receiving and converting an analog detected signal from the photodetection element to a digital signal; and setting means for setting a value of the digital signal as the intensity of the external light.

3. The through hole formation state determining device of claim 1, wherein the external light intensity setting means comprises:

capturing means for capturing the detected signal from the photodetection element when the light emission element is in the light emission state after the external light has set the intensity of the external light;

offsetting means for offsetting by the intensity of the external light set by the setting means a preset threshold to be compared with the detected signal captured from the photodetection element when the light emission element is in the light emission state;

comparing means for comparing the offset threshold with the detected signal from the photodetection element; and predetermined-position determining means for determining based on a result of the comparison by the comparing means whether the aperture in the at least one moving member has aligned with the predetermined position.

4. The through hole formation state determining device of claim 1, comprising:

moving member setting means for moving the at least one moving member such that the aperture in the at least one moving member aligns with the predetermined position, thereby causing light emitted by the light emission element to pass through the aligning aperture; and trimming means for causing the light emission element to emit light in a state in which the aperture in the at least one moving member has aligned with the predetermined position, for capturing a detected signal from the photodetection element obtained by detecting light from the light emission element having passed through the aperture in the at least one moving member, and for setting the value of the detected signal as the threshold.

5. The through hole formation state determining device of claim 1, wherein the number of the at least one moving member is more than one; and which further comprises:

moving member setting means for moving the at least one moving member such that the aperture in each of the at least one moving member aligns with the predetermined position, thereby causing light emitted by the light emission element to pass through the aperture in each of the at least one moving member; and trimming means for capturing detected signals from the photodetection element obtained when the light emission element is in light emission and non-emission states, respectively, and when the aperture in each of the at least one moving member has aligned with the predetermined position, and for setting a difference between the values of these signals as the threshold.

6. The through hole formation state determining device of claim 1, wherein:

the number of the at least one moving member is more than one;

the light emission element and the photodetection element are disposed such that when the aperture in each of the at least one moving member aligns with the predetermined position, the light emitted by the light emission element passes to the photodetection element through the aligning apertures; and the determining means determines based on the value of the detected signal from the photodetection element whether the aperture in each of the at least one moving member has aligned with the predetermined position.

7. The through hole formation state determining device of claim 6, further comprising:

control means for controlling movement of the at least one moving member based on a determination, made by the determining means, as to whether the aperture in each of the at least one moving member has aligned with the predetermined position.

8. An electronic timepiece comprising the through hole formation state determining device of claim 1.

* * * * *